United States Patent
Park

(10) Patent No.: US 12,175,089 B2
(45) Date of Patent: Dec. 24, 2024

(54) STORAGE DEVICE DETERMINING VICTIM MEMORY BLOCK FOR GARBAGE COLLECTION OR WEAR LEVELING, AND METHOD THEREOF

(71) Applicant: SK hynix Inc., Icheon-si (KR)

(72) Inventor: Sung Jin Park, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 30 days.

(21) Appl. No.: 18/171,421

(22) Filed: Feb. 20, 2023

(65) Prior Publication Data
US 2024/0143186 A1 May 2, 2024

(30) Foreign Application Priority Data
Oct. 28, 2022 (KR) .................. 10-2022-0141257

(51) Int. Cl.
*G06F 3/06* (2006.01)
(52) U.S. Cl.
CPC ............ *G06F 3/0616* (2013.01); *G06F 3/064* (2013.01); *G06F 3/0673* (2013.01)

(58) Field of Classification Search
CPC ....... G06F 3/0616; G06F 3/064; G06F 3/0673
See application file for complete search history.

(56) References Cited

U.S. PATENT DOCUMENTS

| 9,830,259 B2 | 11/2017 | Hada |
| 10,725,668 B1* | 7/2020 | Tang ..................... G06F 3/0608 |
| 2015/0026389 A1* | 1/2015 | Li ....................... G06F 12/0246 |
| | | 711/103 |
| 2015/0026391 A1* | 1/2015 | Su ....................... G06F 12/0253 |
| | | 711/103 |
| 2016/0283368 A1 | 9/2016 | Hada |

FOREIGN PATENT DOCUMENTS

KR 10-2022-0046978 A 4/2022

\* cited by examiner

*Primary Examiner* — Gurtej Bansal

(57) ABSTRACT

A storage device may select N number of candidate memory blocks among a plurality of memory blocks according to whether a target operation is garbage collection or wear leveling. The storage device may determine one or more victim memory blocks for the target operation among the candidate memory blocks, on the basis of a deviation in a reference factor among the candidate memory blocks.

17 Claims, 16 Drawing Sheets target operation : GC

| CAND_BLKs | size of valid data |
|---|---|
| CAND_BLK_1 | S1 |
| CAND_BLK_2 | S2 |
| CAND_BLK_3 | S3 |
| ⋮ | ⋮ |
| CAND_BLK_N | SN |

⇓

$$AVG = \left(\sum_{i=1}^{N}(Si)\right) / N$$

$$DEV = \sqrt{\sum_{i=1}^{N}((AVG - Si)^2) / N}$$

FIG. 6 target operation : GC

| CAND_BLKs | size of valid data |
|---|---|
| CAND_BLK_1 | S1 |
| CAND_BLK_2 | S2 |
| CAND_BLK_3 | S3 |
| ⋮ | ⋮ |
| CAND_BLK_N | SN |

⇩

$$AVG = (\sum_{i=1}^{N}(Si)) \ / \ N$$

$$DEV = \sqrt{\sum_{i=1}^{N}((AVG - Si)^2) \ / \ N}$$

FIG. 7

*target operation : WL*

| CAND_BLKs | erase count |
|---|---|
| CAND_BLK_1 | E1 |
| CAND_BLK_2 | E2 |
| CAND_BLK_3 | E3 |
| ⋮ | ⋮ |
| CAND_BLK_N | EN |

⇩

$$AVG = (\sum_{i=1}^{N}(Ei)) / N$$

$$DEV = \sqrt{\sum_{i=1}^{N}((AVG - Ei)^2) / N}$$

DEV <= THR target operation : WL target operation : GC

STORAGE DEVICE DETERMINING VICTIM MEMORY BLOCK FOR GARBAGE COLLECTION OR WEAR LEVELING, AND METHOD THEREOF

CROSS-REFERENCE TO RELATED APPLICATION

The present application claims priority under 35 U.S.C. § 119(a) to Korean Patent Application No. 10-2022-0141257 filed in the Korean Intellectual Property Office on Oct. 28, 2022, which is incorporated herein by reference in its entirety.

BACKGROUND

1. Technical Field

Various embodiments generally relate to a storage device that determines a victim memory block for garbage collection or wear leveling operations, and a method thereof.

2. Related Art

A storage device is a device that stores data on the basis of a request of an external device such as a computer, a mobile terminal such as a smartphone or a tablet, or various other electronic devices.

The storage device may include a controller for controlling a memory (e.g., a volatile memory or a nonvolatile memory). The controller may receive a command from the external device, and may execute or control an operation for reading, writing or erasing data with respect to the memory included in the storage device, on the basis of the received command.

The storage device may perform garbage collection to prevent the size of a free space from decreasing as operations of writing data to the memory are repeated. Also, the storage device may perform wear leveling to prevent an erase operation from being concentrated on only a specific area of the memory and to level erase counts.

SUMMARY

Various embodiments are directed to a storage device capable of preventing or mitigating decreases in the lifetime of storage devices due to an increase in speed or frequency in which erase counts of memory blocks included in a memory increase, and an operating method thereof.

In an embodiment, a storage device may include: i) a memory including a plurality of memory blocks; and ii) a controller configured to select an N (where N is a natural number) number of candidate memory blocks from among the plurality of memory blocks according to whether a target operation is garbage collection or wear leveling, and to determine one or more victim memory blocks for the target operation from among the N number of candidate memory blocks, on the basis of a deviation in a reference factor for each candidate memory block in the N number of candidate memory blocks.

In an embodiment, a method for operating a storage device may include: i) determining a target operation; ii) selecting an N (where N is a natural number) number of candidate memory blocks among a plurality of memory blocks from according to the target operation; iii) calculating a deviation in a reference factor for each of the N number of candidate memory blocks depending on the target operation; and iv) determining one or more victim memory blocks for the target operation from among the N number of candidate memory blocks on the basis of the deviation.

In an embodiment, a controller may include: i) a memory interface capable of communicating with a memory including a plurality of memory blocks; and ii) a control circuit configured to, when executing garbage collection or wear leveling, determine candidate memory blocks among the plurality of memory blocks, and determine, when a deviation in a reference factor among the candidate memory blocks is equal to or less than a set threshold deviation, one or more victim memory blocks for garbage collection or wear leveling according to characteristics of map updates for data stored in the candidate memory blocks.

According to the embodiments of the disclosed technology, it is possible to prevent a problem that the lifetime of a storage device decreases due to an increase in speed in which erase counts of memory blocks included in a memory increase.

BRIEF DESCRIPTION OF THE DRAWINGS

FIG. 6 is a diagram illustrating an example in which a storage device determines a deviation in a reference factor among candidate memory blocks, according to an embodiment of the disclosure.

FIG. 7 is a diagram illustrating another example in which a storage device determines a deviation in a reference factor among candidate memory blocks, according to an embodiment of the disclosure.

DETAILED DESCRIPTION

Figure 1:
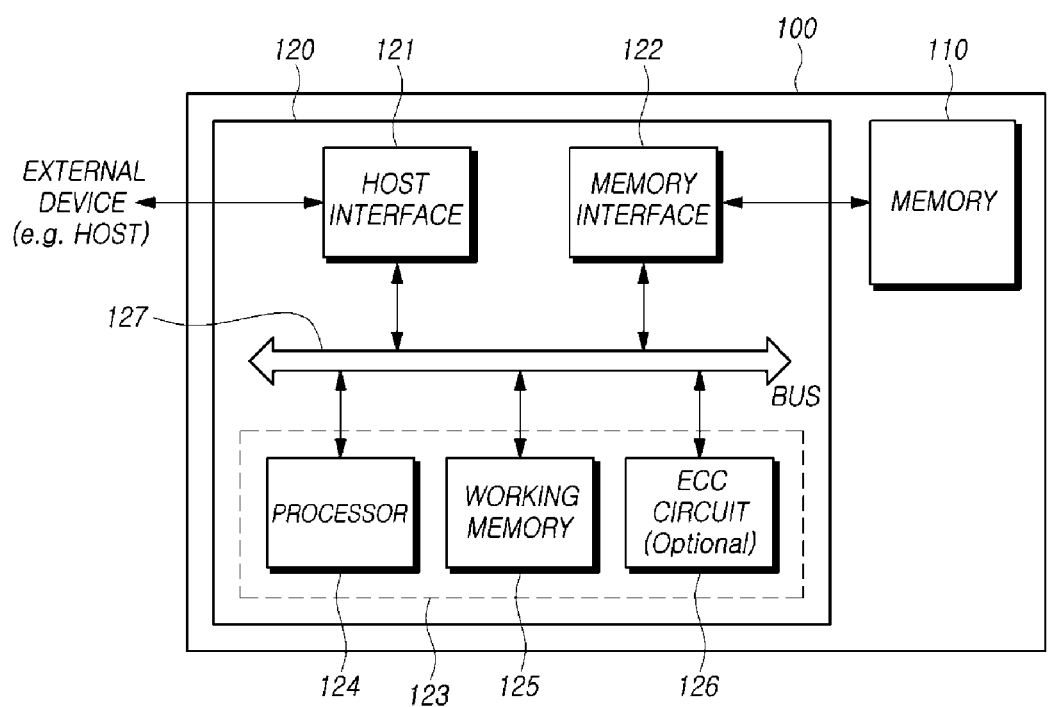
FIG. 1 is a schematic configuration diagram of a storage device according to an embodiment of the disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device according to an embodiment of the disclosure.

Referring to FIG. 1, a storage device 100 may include a memory 110 that stores data, and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells"), which store data. Such a memory cell array may exist in a memory block.

For example, the memory 110 may be implemented into various types of memory such as a NAND flash memory, a 3D NAND flash memory, a NOR flash memory, a resistive random access memory (RRAM), a phase-change random access memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area that is selected by the address in the memory cell array. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, a mobility device (e.g., a vehicle, a robot or a drone) capable of traveling under human control or autonomous driving, etc.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be implemented by being integrated into one device. Hereafter, for the sake of convenience in explanation, embodiments will be described with the controller 120 and the host separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an SMBus (system management bus) protocol, an I2C (inter-integrated circuit) protocol, an I3C (improved inter-integrated circuit) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, embodiments of an operation of the storage device 100 will be described as implemented in such a way that the processor 124 executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL) which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110 but is not loaded in the working memory 125, the processor 124 may generate an event (e.g., an interrupt) for loading the corresponding part of the firmware into the working memory 125 from the memory 110.

The processor 124 may load metadata necessary for driving firmware, from the memory 110. The metadata, as data for managing the memory 110, may include management information on user data stored in the memory 110.

Firmware may be updated while the storage device 100 is manufactured or while the storage device 100 is executed. The controller 120 may download new firmware from the outside of the storage device 100 and update existing firmware with the new firmware.

The working memory 125 may store firmware, a program code, a command and data that are necessary to drive the controller 120. A working memory 125 may be, for example, a volatile memory that includes at least one among an SRAM (static RAM), a DRAM (dynamic RAM) and an SDRAM (synchronous DRAM).

The error detection and correction circuit 126 may detect an error bit of target data and correct the detected error bit by using an error correction code. The target data may be, for example, data stored in the working memory 125 or data read from the memory 110.

The error detection and correction circuit 126 may be implemented to decode data by using an error correction code. The error detection and correction circuit 126 may be implemented by various code decoders. For example, a decoder that performs unsystematic code decoding or a decoder that performs systematic code decoding may be used.

For example, the error detection and correction circuit 126 may detect an error bit by the unit of a set sector in each of read data. Each read data may be constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not by units of sectors. For example, when a bit error rate (BER) is higher than a set reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect an uncorrectable sector. There may be one or more sectors that are determined to be uncorrectable. The error detection and correction circuit 126 may transfer information (for example, address information) regarding a sector which is determined to be uncorrectable, to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some of the components among the above-described components 121, 122, 124, 125 and 126 of the controller 120 may be omitted, or some of the components among the above-described components 121, 122, 124, 125 and 126 of the controller 120 may be integrated into one component. In other embodiments, one or more other components may be added in addition to the above-described components 121, 122, 124, 125 and 126 of the controller 120.

Hereinbelow, the memory 110 will be described in further detail with reference to FIG. 2.

Figure 2:
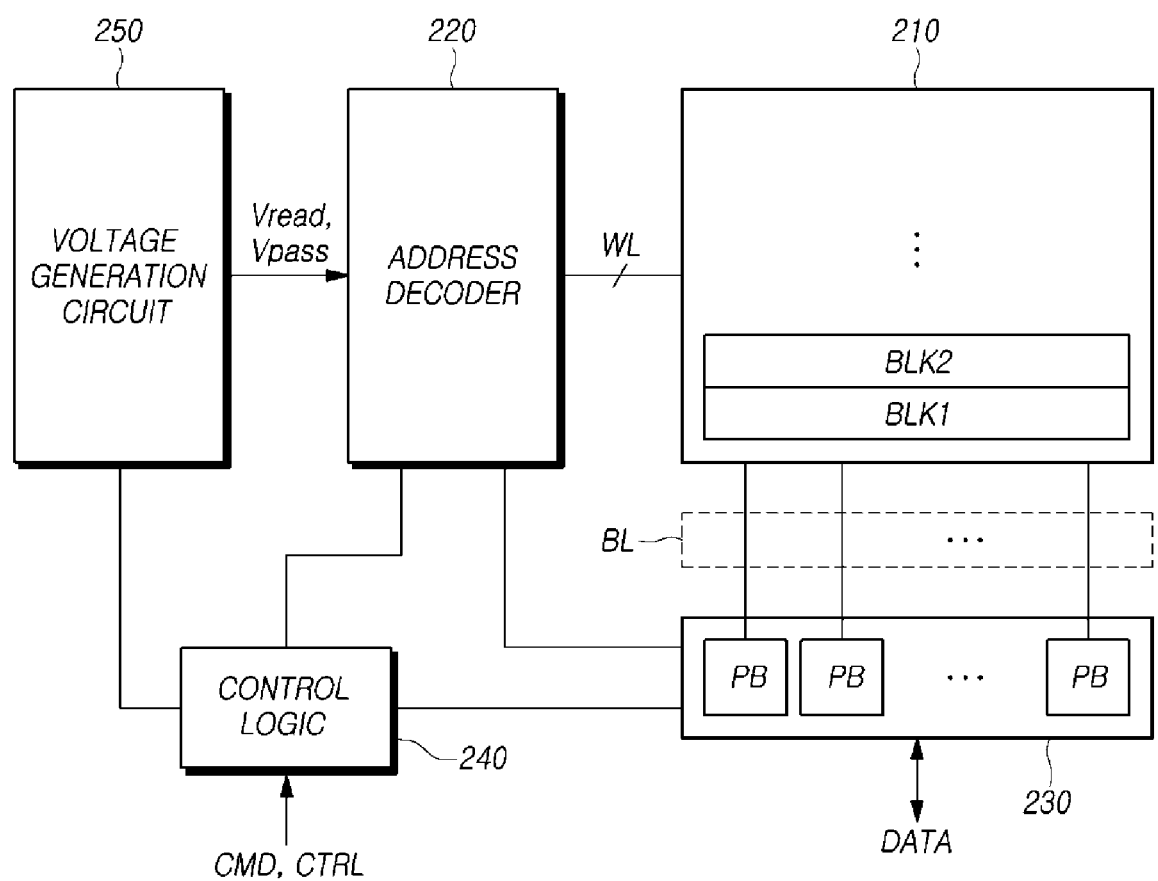
FIG. 2 is a block diagram schematically illustrating a memory of FIG. 1.

FIG. 2 is a diagram schematically illustrating a memory of FIG. 1.

Referring to FIG. 2, a memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and writhe circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

During a read operation, the address decoder 220 may apply the read voltage Vread to a selected word line WL in a selected memory block in a read voltage applying operation. The address decoder 220 may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
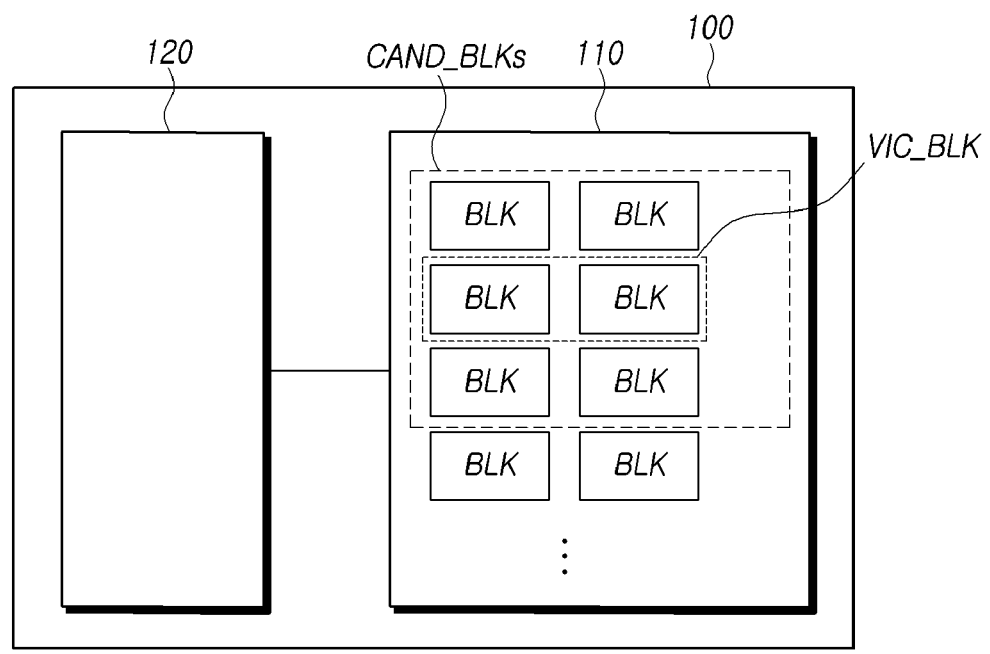
FIG. 3 is a diagram illustrating a structure of a storage device according to an embodiment of the disclosure.

FIG. 3 is a diagram illustrating a structure of a storage device according to an embodiment of the disclosure.

Referring to FIG. 3, a storage device 100 may include a memory 110 and a controller 120.

The memory 110 may include a plurality of memory blocks BLK.

The controller 120 may select an N (where N is a natural number) number of candidate memory blocks, from among the plurality of memory blocks BLK, as illustrated by CAND_BLKS in FIG. 3. The controller 120 may target and select the candidate memory blocks according to whether a target operation is garbage collection or wear leveling.

The controller 120 may determine one or more victim memory blocks VIC_BLK for the target operation from among the candidate memory blocks CAND_BLKS. When the target operation is executed, data stored in the victim memory blocks VIC_BLK is migrated to other memory blocks in the memory 110.

In an embodiment, the controller 120 may select the one or more victim memory blocks VIC_BLK, from among the candidate memory blocks CAND_BLKS, on the basis of a deviation in a reference factor. That is to say, a method for the controller 120 to determine the victim memory blocks VIC_BLK may be changed depending on deviations in reference factors among candidate memory blocks CAND_BLKS. The reference factor may be changed depending on the target motion.

Hereinafter, this will be described in detail with reference to the drawings.

First, an operation for the storage device 100 to select candidate memory blocks according to a target operation will be described with reference to FIGS. 4 and 5.

Figure 4:
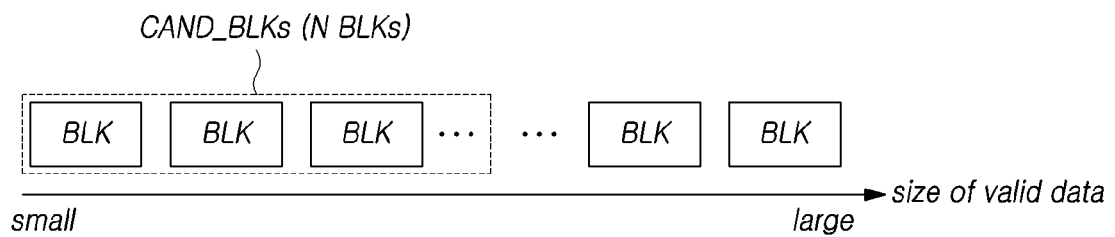
FIG. 4 is a diagram illustrating an example of an operation in which a storage device determines candidate memory blocks, according to an embodiment of the disclosure.

FIG. 4 is a diagram illustrating an example of an operation in which a storage device determines candidate memory blocks, according to an embodiment of the disclosure.

FIG. 4 illustrates an operation in which, when the target operation is garbage collection GC, a storage device 100 determines an N number of candidate memory blocks CAND_BLKs from among the plurality of memory blocks BLK.

In FIG. 4, a controller 120 may determine a sequence of memory blocks BLK depending on the size of valid data stored in each of the plurality of memory blocks BLK in the sequence.

The controller 120 may select an N number of memory blocks that have the smallest size of stored valid data from among the plurality of memory blocks BLK. The selected N number of memory blocks are the candidate memory blocks CAND_BLKS. This is to reduce the size of data to be migrated to secure free memory blocks when garbage collection is executed.

Figure 5:
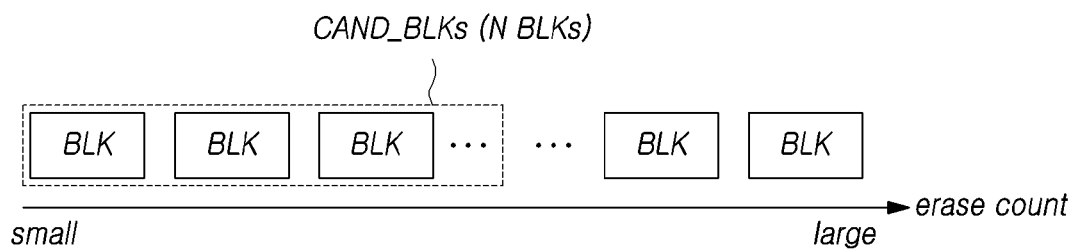
FIG. 5 is a diagram illustrating another example of an operation in which a storage device determines candidate memory blocks, according to an embodiment of the disclosure.

FIG. 5 is a diagram illustrating another example of an operation in which a storage device determines candidate memory blocks, according to an embodiment of the disclosure.

FIG. 5 illustrates an operation in which, when the target operation is wear leveling, a storage device 100 determines the candidate memory blocks from among the plurality of memory blocks BLK.

In FIG. 5, a controller 120 may target a sequence of blocks from among the plurality of memory blocks BLK depending on an erase count for each of the plurality of memory blocks BLK.

The controller 120 may select an N number of sequential memory blocks that have the lowest erase count from among different N number of memory blocks BLK. The selected N number of memory blocks are the candidate memory blocks CAND_BLKS. This is to allow new data to be written to memory blocks having the lowest erase count.

Hereinafter, an operation in which the controller 120 determines a deviation in a reference factor from among the N number of selected candidate memory blocks CAND_BLKS will be described with reference to FIGS. 6 and 7.

FIG. 6 is a diagram illustrating an example in which a storage device determines a deviation in a reference factor in candidate memory blocks, according to an embodiment of the disclosure.

In FIG. 6, when a target operation is garbage collection, a controller 120 may use the size of valid data as the reference factor.

In FIG. 6, an N number of sequential candidate memory blocks CAND_BLKS are CAND_BLK_1, CAND_BLK_2, CAND_BLK_3, ..., and CAND_BLK_N. The sizes of valid data for CAND_BLK_1, CAND_BLK_2, CAND_BLK_3, ..., and CAND_BLK_N are, respectively, S1, S2, S3, ..., and SN.

An average AVG of the sizes of the valid data for the candidate memory blocks CAND_BLK_1, CAND_BLK_2, CAND_BLK_3, ..., and CAND_BLK_N may be calculated as $(\Sigma_{i=1}^{N}(Si))/N$.

Furthermore, a standard deviation of the sizes of the valid data for each of the candidate memory blocks CAND_BLK_1, CAND_BLK_2, CAND_BLK_3, ..., and CAND_BLK_N may be determined as $\sqrt{\Sigma_{i=1}^{N}((AVG-Si)^2)/N}$. For each of the candidate memory blocks CAND_BLK_1, CAND_BLK_2, CAND_BLK_3, ..., and CAND_BLK_N, the controller 120 may calculate a standard deviation as a deviation DEV, which is a standard deviation in the size of valid data from the average size of valid data for the N number of candidate memory blocks CAND_BLKS.

In another embodiment, however, instead of using a standard deviation for average size as described above, the controller 120 may determine a dispersion $\Sigma_{i=1}^{N}((AVG-Si)^2)/N$ for the N number of candidate memory blocks CAND_BLKS, and the dispersion is used as the deviation DEV for the size of valid data as the reference factor. For example, the dispersion may be calculated for the N number of candidate memory blocks CAND_BLK_1, CAND_BLK_2, CAND_BLK_3, ..., and CAND_BLK_N.

FIG. 7 is a diagram illustrating another example in which a storage device determines a deviation in a reference factor in candidate memory blocks, according to an embodiment of the disclosure.

In FIG. 7, when a target operation is wear leveling, a controller 120 may use an erase count as the reference factor.

In FIG. 7, an N number of sequential candidate memory blocks CAND_BLKS are CAND_BLK_1, CAND_BLK_2, CAND_BLK_3, ..., and CAND_BLK_N. Erase counts for CAND_BLK_1, CAND_BLK_2, CAND_BLK_3, ..., and CAND_BLK_N are, respectively, E1, E2, E3, ..., and EN.

An average AVG of the erase counts for the N number of candidate memory blocks CAND_BLK_1, CAND_BLK_2, CAND_BLK_3, ..., and CAND_BLK_N may be calculated as $(\Sigma_{i=1}^{N}(Ei))/N$.

Furthermore, a standard deviation of the erase counts for each of the N number of candidate memory blocks CAND_BLK_1, CAND_BLK_2, CAND_BLK_3, ..., and CAND_BLK_N may be determined as $\sqrt{\Sigma_{i=1}^{N}((AVG-Ei)^2)/N}$. For each of the candidate memory blocks CAND_BLK_1, CAND_BLK_2, CAND_BLK_3, ..., and CAND_BLK_N, the controller 120 may calculate a standard deviation as a deviation DEV, which is a standard deviation in the erase count from the average erase count for the N number of candidate memory blocks CAND_BLKS.

In another embodiment, however, instead of using a standard deviation for erase count as described above, the controller 120 may determine a dispersion $\Sigma_{i=1}^{N}((AVG-Ei)^2)/N$ for the N number of candidate memory blocks CAND_BLKS, and the dispersion is used as the deviation DEV for the erase count as the reference factor. For example, the dispersion may be calculated for the N number of candidate memory blocks CAND_BLK_1, CAND_BLK_2, CAND_BLK_3, ..., and CAND_BLK_N.

Hereinafter, an operation in which the storage device 100 determines victim memory blocks VIC_BLK on the basis of the deviation DEV in the reference factor will be described.

Figure 8:
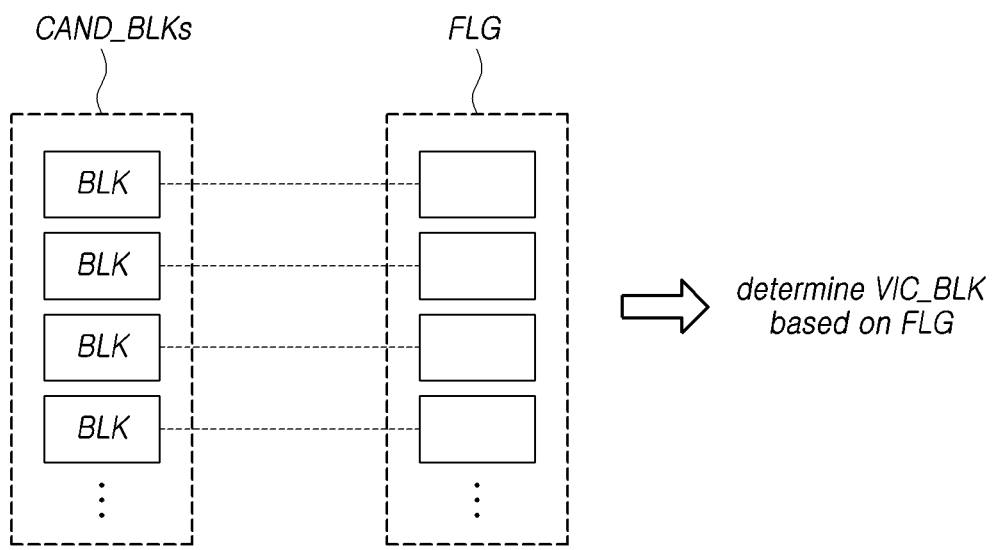
FIG. 8 is a diagram illustrating an example of an operation in which a storage device determines victim memory blocks, according to an embodiment of the disclosure.

FIG. 8 is a diagram illustrating an example of an operation in which a storage device determines victim memory blocks, according to an embodiment of the disclosure.

Referring to FIG. 8, when a deviation DEV in a reference factor associated with the N number of candidate memory blocks CAND_BLKS is equal to or less than a set threshold deviation THR, a controller 120 of a storage device 100 may determine victim memory blocks VIC_BLK for a target operation according to flags FLG set for each of the candidate memory blocks.

A large deviation DEV from the average AVG reference factor for individual candidate memory blocks (e.g., BLK in FIG. 8) facilitates the identification of victim memory blocks VIC_BLK for the target operation. For example, when the target operation is garbage collection, if the target operation uses as the victim memory blocks VIC_BLK, memory blocks BLK in which the sizes of valid data stored therein are small, then the sizes of data to be migrated during the operation may be reduced.

However, where the deviation DEV in the reference factor for individual candidate memory blocks (e.g., BLK in FIG. 8) is small, another factor other than the sizes of stored valid data needs to be considered with respect to the victim memory blocks VIC_BLK used in the target operation. This is because costs incurred due to another factor may be greater than gains obtained when the victim memory blocks VIC_BLK of the target operation are determined according to the reference factor.

For example, when the target operation is garbage collection, after valid data stored in the victim memory blocks VIC_BLK are migrated to other memory blocks, the erase counts of the victim memory blocks VIC_BLK increase, and so wear leveling may be additionally executed, which in turn increases the speed or frequency at which the erase counts of the memory blocks BLK included in the memory 110 may increase. As a result, the lifetime of the storage device 100 may be shortened.

Therefore, in order to prevent this problem, when the deviation DEV in the reference factor is small, the controller 120 may select the victim memory blocks VIC_BLK for the target operation on the basis of the flags FLG set for each of the N number of candidate memory blocks CAND_BLKS. Each flag FLG may indicate a characteristic (e.g., a strong sequential characteristic or a strong random characteristic) of data stored in a corresponding candidate memory block (i.e., BLK in FIG. 8).

Figure 9:
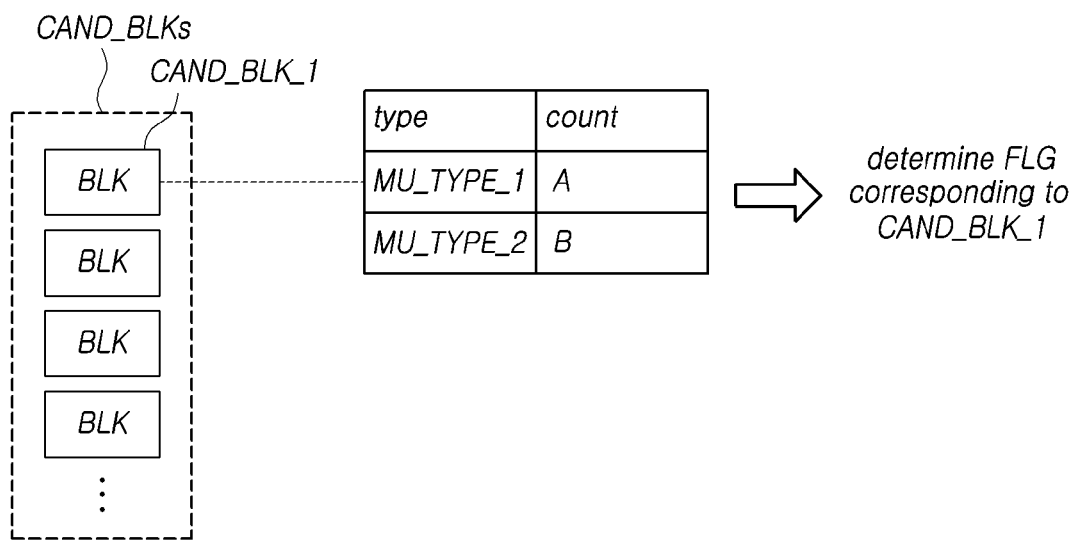
FIG. 9 is a diagram illustrating an example of an operation in which a storage device determines a flag of a first candidate memory block, according to an embodiment of the disclosure.

FIG. 9 is a diagram illustrating an example of an operation in which a storage device determines a flag of a first candidate memory block, according to an embodiment of the disclosure.

Referring to FIG. 9, a controller 120 of a storage device 100 may determine a flag FLG for a first candidate memory block CAND_BLK_1 according to a count A of first type map updates MU_TYPE_1 and a count B of second type map updates MU_TYPE_2 for the first candidate memory block CAND_BLK_1. The first candidate memory block CAND_BLK_1 is a candidate memory block in the N number of candidate memory blocks CAND_BLKS.

The first type map update MU_TYPE_1 may indicate that the proportion of sequential writing is high. This may indicate that, when specific data is written to the first candidate memory block CAND_BLK_1, among data units (e.g., pages) constituting the corresponding data, there are many data units whose logical addresses are consecutive.

The second type map update MU_TYPE_2 may indicate that the proportion of random writing is high. This may indicate that, when specific data is written to the first candidate memory block CAND_BLK_1, among data units constituting the corresponding data, there are not many data units whose logical addresses are consecutive.

When data is stored in the first candidate memory block CAND_BLK_1, a map update for the corresponding data is performed in a mapping table that manages mapping information between logical addresses and physical addresses. The type of the map update performed in the mapping table may vary depending on whether the corresponding data has a high proportion of sequential writing or a high proportion of random writing.

Therefore, the controller 120 may use count A of first type map updates MU_TYPE_1 and the count B of second type map updates MU_TYPE_2 for the first candidate memory block CAND_BLK_1 to determine whether the proportion of sequential writing performed on the first candidate memory block CAND_BLK_1 is high or the proportion of random writing performed on the first candidate memory block CAND_BLK_1 is high. The controller 120 may accordingly set the flag FLG for the first candidate memory block CAND_BLK_1.

Figure 10:
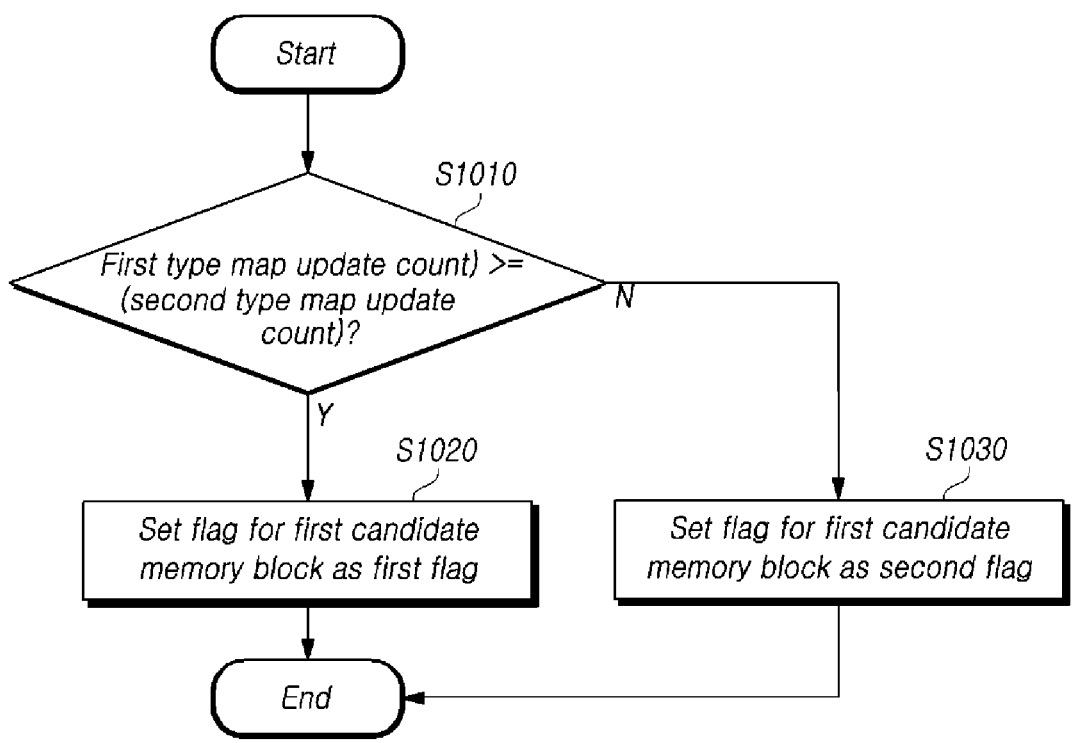
FIG. 10 is a flowchart illustrating an example of an operation in which a storage device sets a flag of a first candidate memory block, according to an embodiment of the disclosure.

FIG. 10 is a flowchart illustrating an example of an operation in which a storage device sets a flag of a first candidate memory block, according to an embodiment of the disclosure.

Referring to FIG. 10, a controller 120 determines whether a count of first type map updates MU_TYPE_1 is equal to or greater than a count of second type map updates MU_TYPE_2 (S1010).

When the count of first type map updates MU_TYPE_1 is equal to or greater than the count of second type map updates MU_TYPE_2 (S1010-Y), the controller 120 may set a flag FLG for the first candidate memory block CAND_BLK_1 as a first flag (S1020). In other words, the first flag may indicate that map updates by sequential writing have occurred more than map updates by random writing, for data stored in the first candidate memory block CAND_BLK_1.

On the other hand, when the count of first type map updates MU_TYPE_1 is less than the count of second type map updates MU_TYPE_2 (S1010-N), the controller 120 may set a flag FLG for the first candidate memory block CAND_BLK_1 as a second flag (S1030). In other words, the second flag may indicate that map updates by random writing have occurred more than map updates by sequential writing, for data stored in the first candidate memory block CAND_BLK_1.

Hereinafter, an operation in which, in order to set a flag FLG for the first candidate memory block CAND_BLK_1, the controller 120 calculates the count of first type map updates MU_TYPE_1 and the count of second type map updates MU_TYPE_2 will be described.

Figure 11:
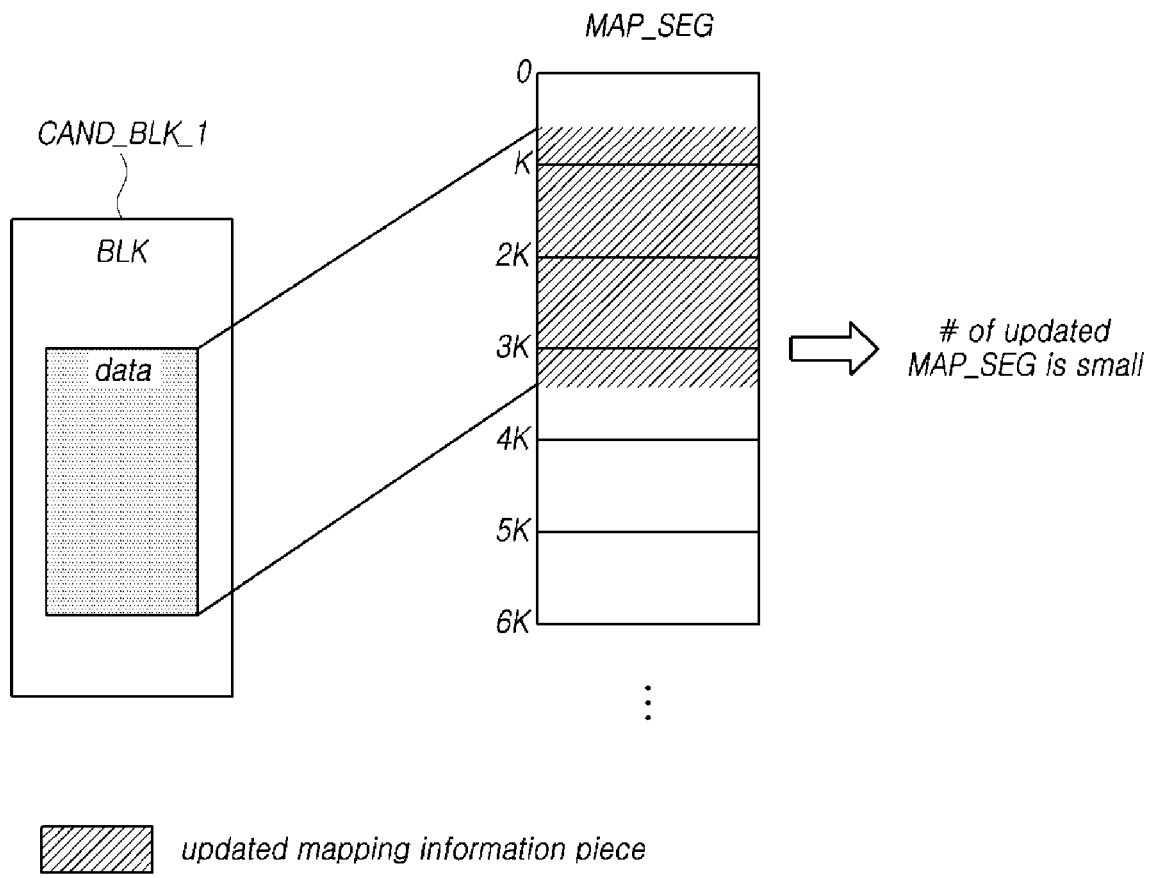
FIG. 11 is a diagram illustrating an example in which a plurality of map segments are updated when data is written to a first candidate memory block according to an embodiment of the disclosure.

FIG. 11 is a diagram illustrating an example in which a plurality of map segments are updated when data is written to a first candidate memory block, according to an embodiment of the disclosure.

Referring to FIG. 11, in a first candidate memory block CAND_BLK_1, each of a plurality of map segments MAP_SEG may include K (where K is a natural number of 2 or greater) number of mapping information pieces. Each of the K number of mapping information pieces may indicate mapping information between a specific logical address and a specific physical address. For example, one map segment may include 512 mapping information pieces, and one mapping information piece may indicate mapping information between one logical address (a size of 4 bytes) and one physical address (a size of 4 bytes). In FIG. 11, six map segments MAP_SEG are illustrated with each map segment having one K of mapping information pieces.

When at least one among the mapping information pieces included in one map segment is updated, the corresponding map segment is updated.

In FIG. 11, when data are sequentially written to the first candidate memory block CAND_BLK_1, updated mapping information pieces are concentrated on specific map segments MAP_SEG within the plurality of map segments MAP_SEG. Therefore, there is a high possibility that the total number of updated map segments MAP_SEG within the plurality of map segments MAP_SEG is small.

Figure 12:
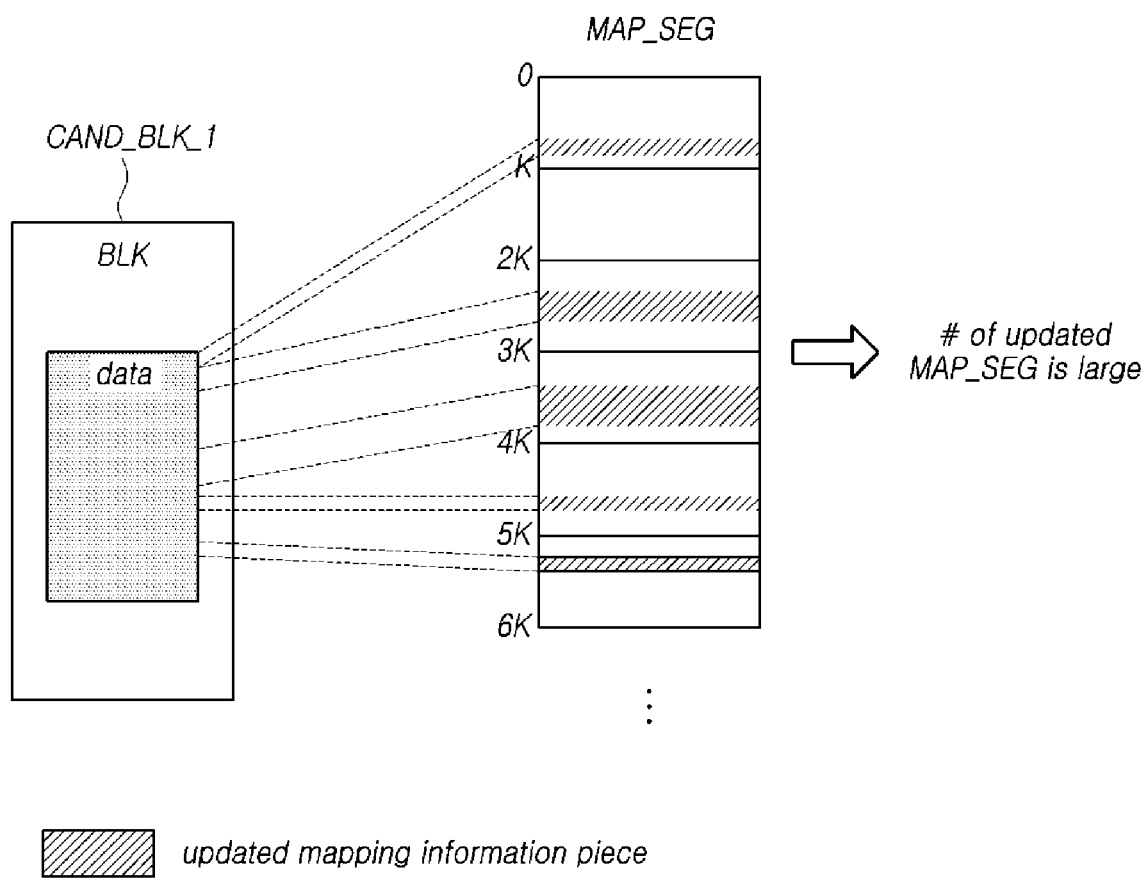
FIG. 12 is a diagram illustrating another example in which a plurality of map segments are updated when data is written to a first candidate memory block according to an embodiment of the disclosure.

FIG. 12 is a diagram illustrating another example in which a plurality of map segments are updated when data is written to a first candidate memory block according to an embodiment of the disclosure.

Referring to FIG. 12, when data are randomly written to a first candidate memory block CAND_BLK_1, updated mapping information pieces are dispersed in a plurality of map segments MAP_SEG. Therefore, there is a high possibility that the total number of updated map segments MAP_SEG within the plurality of map segments MAP_SEG is large.

Figure 13:
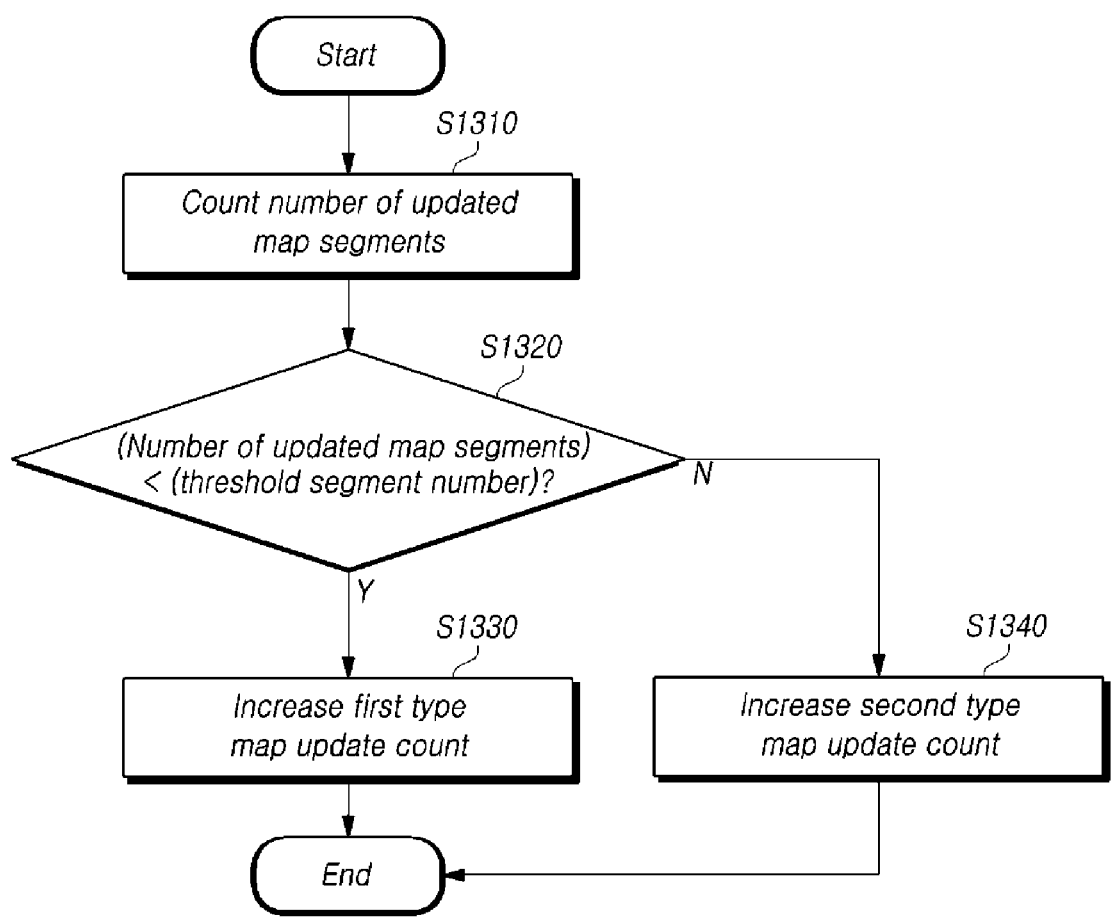
FIG. 13 is a flowchart illustrating an example of an operation in which a storage device increases a first type map update count or a second type map update count, according to an embodiment of the disclosure.

FIG. 13 is a flowchart illustrating an example of an operation in which a storage device increases a first type map update count or a second type map update count, according to an embodiment of the disclosure.

Referring to FIG. 13, a controller 120 of a storage device 100 may count the number of map segments MAP_SEG updated while data is written to a first candidate memory block CAND_BLK_1 (S1310). The size of data to be written may be a preset value (e.g., 50 MB).

The controller 120 determines whether the number of updated map segments MAP_SEG is less than a set threshold segment number (S1320).

When the number of updated map segments MAP_SEG is less than the threshold segment number (S1320-Y), the controller 120 may increase the count of first type map updates MU_TYPE_1 (S1330). As described above with reference to FIG. 11, a smaller number of updated map segments means that the likelihood of sequential writing is high.

On the other hand, when the number of updated map segments MAP_SEG is equal to or greater than the threshold segment number (S1320-N), the controller 120 may increase the count of second type map updates MU_TYPE_2 (S1340). As described above with reference to FIG. 12, a larger number of updated map segments means that the likelihood of random writing is high.

Figure 14:
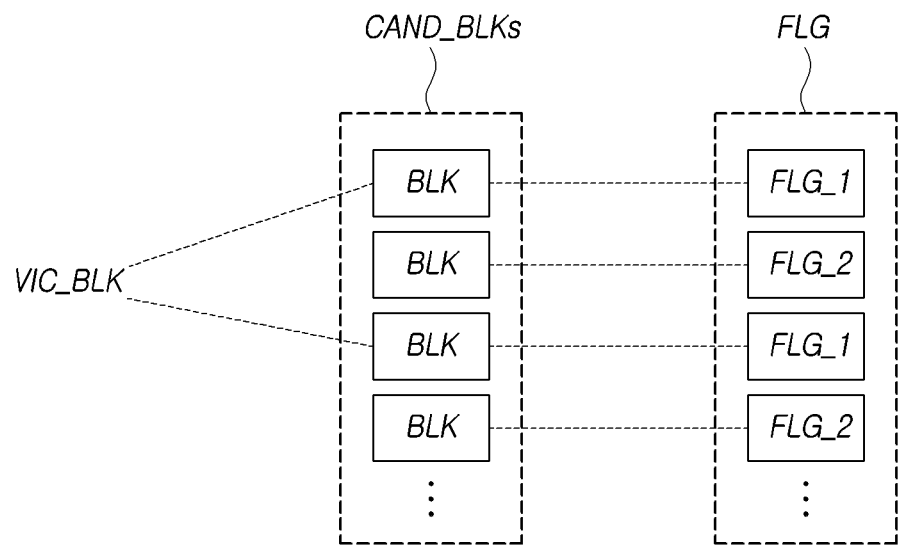
FIG. 14 is a diagram illustrating an example of an operation in which a storage device determines victim memory blocks on the basis of flags of candidate memory blocks, according to an embodiment of the disclosure.

FIG. 14 is a diagram illustrating an example of an operation in which a storage device determines victim memory blocks on the basis of flags of candidate memory blocks, according to an embodiment of the disclosure.

In FIG. 14, the target operation is wear leveling.

When the target operation is wear leveling, a controller 120 of a storage device 100 may determine which candidate memory blocks (e.g., BLK in FIG. 14) within an N number of candidate memory block CAND_BLKS have a flag FLG set as a first flag FLG_1. The candidate memory blocks BLK with a first flag FLG_1 may be selected by the controller 120 as victim memory blocks VIC_BLK for the target operation.

For example, when the target operation is wear leveling, if the deviation in a reference factor (e.g., an erase count) for a candidate memory block (e.g., BLK in FIG. 14) is not large, then the controller 120 may determine, using flags, the candidate memory blocks BLK within the N number of candidate memory blocks CAND_BLKS in which sequential writing is executed more, and select the flagged blocks as the victim memory blocks VIC_BLK.

The controller 120 may determine that sequentially written data are highly likely to be cold data. Accordingly, the controller 120 may migrate the sequentially written data to a memory block with a high erase count, thereby reducing a possibility that the memory block with a high erase count is erased again.

Figure 15:
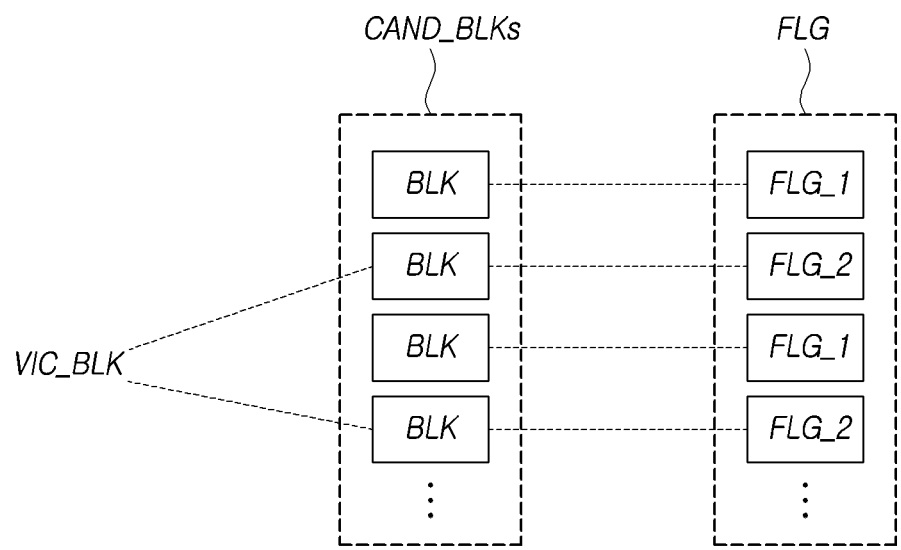
FIG. 15 is a diagram illustrating another example of an operation in which a storage device determines victim memory blocks on the basis of flags of candidate memory blocks, according to an embodiment of the disclosure.

FIG. 15 is a diagram illustrating another example of an operation in which a storage device determines victim memory blocks on the basis of flags of candidate memory blocks, according to an embodiment of the disclosure.

In FIG. 15, the target operation is garbage collection.

When the target operation is garbage collection, a controller 120 of a storage device 100 may determine which candidate memory blocks (e.g., BLK in FIG. 15) within an N number of candidate memory blocks CAND_BLKS have a flag FLG set to a second flag FLG_2. The candidate memory blocks BLK with a second flag FLG_2 may be selected by the controller 120 as the victim memory blocks VIC_BLK for the target operation.

For example, when the target operation is garbage collection, if the deviation in a reference factor (e.g., the size of valid data) for a candidate memory block (e.g., BLK in FIG. 15) is not large, then the controller 120 may determine, using flags, the candidate memory blocks BLK within the N number of candidate memory blocks CAND_BLKS in which random writing is executed more, and select the flagged blocks as the victim memory blocks VIC_BLK.

The controller 120 may determine that randomly written data are highly likely to be hot data. Accordingly, the controller 120 may execute garbage collection on the randomly written data, thereby preventing the number of free memory blocks included in the memory 110 from being reduced due to data which has a high access frequency.

Figure 16:
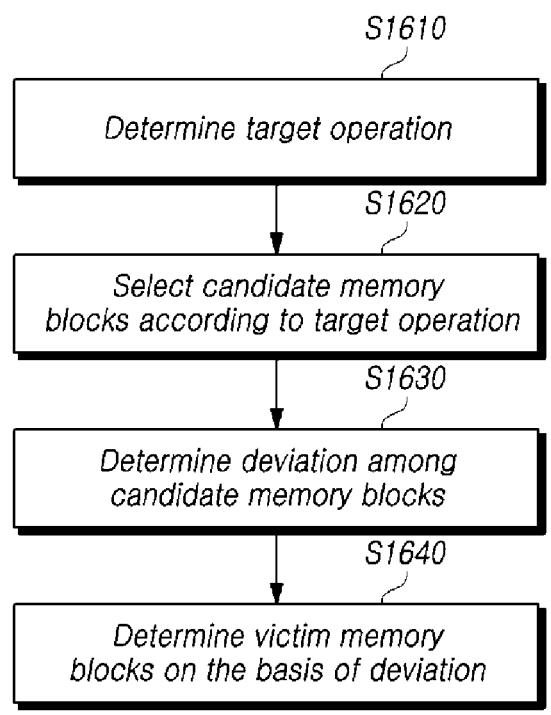
FIG. 16 is a diagram illustrating a method for operating a storage device according to an embodiment of the disclosure.

FIG. 16 is a diagram illustrating a method for operating a storage device according to an embodiment of the disclosure.

Referring to FIG. 16, a method for operating a storage device 100 may include determining a target operation to be executed (S1610). The target operation may be garbage collection or wear leveling.

The method for operating the storage device 100 may include selecting an N (N is a natural number) number of candidate memory blocks CAND_BLKS from among a plurality of memory blocks BLK according to whether the target operation is garbage collection or wear leveling (S1620).

For example, when the target operation is garbage collection, the candidate memory blocks CAND_BLKS may be an N number of memory blocks BLK having a smallest size of stored valid data among the plurality of memory blocks BLK. For another example, when the target operation is wear leveling, the candidate memory blocks CAND_BLKS may be an N number of memory blocks BLK having a smallest erase count among the plurality of memory blocks BLK.

The method for operating the storage device 100 may include differently calculating a deviation in a reference factor for each of the blocks in the N number of candidate memory blocks CAND_BLKS determined at the step S1620, depending on the target operation (S1630).

For example, when the target operation is garbage collection, the reference factor may be the size of valid data. For another example, when the target operation is wear leveling, the reference factor may be an erase count.

The method for operating the storage device 100 may include determining one or more victim memory blocks VIC_BLK for the target operation, which is identified from among the N number of candidate memory blocks CAND_BLKS on the basis of the deviation calculated at the step S1630 (S1640).

For example, at step S1640, the victim memory blocks VIC_BLK for the target operation may be identified from among the N number of candidate memory blocks CAND_BLKS on the basis of flags FLG set for each of the N number of candidate memory blocks CAND_BLKS, with the flags indicating when the deviation is equal to or less than a set threshold deviation.

The flag FLG for a first candidate memory block CAND_BLK_1, from among the N number of candidate memory blocks CAND_BLKS, may be set as a first flag or a second flag on the basis of a count of first type map updates MU_TYPE_1 indicating that the proportion of sequential writing is high and a count of second type map updates MU_TYPE_2 indicating that the proportion of random writing is high.

For example, when, for the first candidate memory block CAND_BLK_1, the count of first type map updates MU_TYPE_1 is equal to or greater than the count of second type map updates MU_TYPE_2, the flag FLG for the first candidate memory block CAND_BLK_1 may be set as the first flag, and when, for the first candidate memory block CAND_BLK_1, the count of first type map updates MU_TYPE_1 is less than the count of second type map updates MU_TYPE_2, the flag FLG for the first candidate memory block CAND_BLK_1 may be set as the second flag. The count of first type map updates MU_TYPE_1 may be increased when the number of map segments updated while data is written to the first candidate memory block CAND_BLK_1 is less than a set threshold segment number, and the count of second type map update MU_TYPE_2 may be increased when the number of map segments updated while data is written to the first candidate memory block CAND_BLK_1 is equal to or greater than the threshold segment number.

For example, when the target operation is wear leveling, at step S1640, the victim memory blocks VIC_BLK for the target operation may be identified from among the N number of candidate memory blocks CAND_BLKS as candidate memory blocks in which the flag FLG is set as the first flag.

For another example, when the target operation is garbage collection, at step S1640, the victim memory blocks VIC_BLK for the target operation may be identified from among the N number of candidate memory blocks CAND_BLKS as candidate memory blocks in which the flag FLG is set as the second flag.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
    a memory including a plurality of memory blocks; and
    a controller configured to select an N (where N is a natural number) number of candidate memory blocks from among the plurality of memory blocks according to whether a target operation is garbage collection or wear leveling, and to determine one or more victim memory blocks for the target operation from among the N number of candidate memory blocks, on the basis of a deviation in a reference factor for each candidate memory block in the N number of candidate memory blocks,
    wherein the controller sets flags for candidate memory blocks within the N number of candidate memory blocks when the deviation is equal to or less than a set threshold deviation, and determines the victim memory blocks for the target operation on the basis of flags set for the candidate memory blocks,
    wherein the flags are different from the reference factor, and
    wherein each of the flags indicate a characteristic of data stored in a candidate memory block corresponding to the flag.

2. The storage device according to claim 1, wherein when the target operation is garbage collection, the controller selects the N number of candidate memory blocks as the N number of memory blocks with the smallest size of stored valid data, and when the target operation is wear leveling, the controller selects the N number of candidate memory blocks as the N number of memory blocks with the smallest erase count.

3. The storage device according to claim 2, wherein the controller determines a size of valid data as the reference factor when the target operation is garbage collection, and determines an erase count as the reference factor when the target operation is wear leveling.

4. The storage device according to claim 1, wherein, for a first candidate memory block from among the N number of candidate memory blocks, the controller sets a flag for the first candidate memory block as a first flag on the basis of a count of first type map updates indicating that a proportion of sequential writing is high or a second flag on the basis of a count of second type map updates indicating that a proportion of random writing is high.

5. The storage device according to claim 4, wherein the controller sets the flag for the first candidate memory block as the first flag when the count of first type map updates is equal to or greater than the count of second type map updates,, and sets the flag for the first candidate memory block as the second flag when the count of first type map updates is less than the count of second type map updates.

6. The storage device according to claim 4, wherein the controller increases the count of first type map updates when the number of map segments updated while data is written to the first candidate memory block is less than a set threshold segment number, and increases the count of second type map updates when the number of map segments updated while data is written to the first candidate memory block is equal to or greater than the threshold segment number.

7. The storage device according to claim 4, wherein, when the target operation is wear leveling, the controller determines the victim memory blocks for the target operation as the candidate memory blocks from among the N number of candidate memory blocks in which a flag is set as the first flag.

8. The storage device according to claim 4, wherein, when the target operation is garbage collection, the controller determines the victim memory blocks for the target operation as the candidate memory blocks from among the N number of candidate memory blocks in which a flag is set as the second flag.

9. A method for operating a storage device, comprising:
    determining a target operation to be executed, as garbage collection or wear leveling;
    selecting an N (where N is a natural number) number of candidate memory blocks from among a plurality of memory blocks according to whether the target operation is garbage collection or wear leveling;
    calculating a deviation in a reference factor for each of the N number of candidate memory blocks depending on the target operation; and
    determining one or more victim memory blocks for the target operation from among the N number of candidate memory blocks on the basis of the deviation,
    wherein the method further comprising setting flags for each of the N number of candidate memory blocks when the deviation is equal to or less than a set threshold deviation,
    wherein the one or more victim memory blocks for the target operation are determined according to the flags,
    wherein the flags are different from the reference factor, and wherein each of the flags indicate a characteristic of data stored in a candidate memory block corresponding to the flag.

10. The method according to claim 9, wherein
when the target operation is garbage collection, the N number of candidate memory blocks are an N number of memory blocks having a smallest size of stored valid data among the plurality of memory blocks, and
when the target operation is wear leveling, the N number of candidate memory blocks are an N number of memory blocks having a smallest erase count among the plurality of memory blocks.

11. The method according to claim 10, wherein
when the target operation is garbage collection, the reference factor is a size of valid data, and
when the target operation is wear leveling, the reference factor is an erase count.

12. The method according to claim 9, wherein a flag for a first candidate memory block from among the N number of candidate memory blocks is set as a first flag on the basis of a count of first type map updates indicating that a proportion of sequential writing is high or a second flag on the basis of a count of second type map updates indicating that a proportion of random writing is high.

13. The method according to claim 12, wherein
when, for the first candidate memory block, the count of first type map updates is equal to or greater than the count of second type map updates, the flag for the first candidate memory block is set as the first flag, and
when, for the first candidate memory block, the count of first type map updates is less than the count of second type map updates, the flag for the first candidate memory block is set as the second flag.

14. The method according to claim 12, wherein
the count of first type map updates increases when the number of map segments updated while data is written to the first candidate memory block is less than a set threshold segment number, and
the count of second type map updates increases when the number of map segments updated while data is written to the first candidate memory block is equal to or greater than the threshold segment number.

15. The method according to claim 12, wherein when the target operation is wear leveling, the victim memory blocks for the target operation are the candidate memory blocks from among the N number of candidate memory blocks in which a flag is set as the first flag.

16. The method according to claim 12, wherein when the target operation is garbage collection, the victim memory blocks for the target operation are the candidate memory blocks from among the N number of candidate memory blocks in which a flag is set as the second flag.

17. A controller comprising:
a memory interface capable of communicating with a memory including a plurality of memory blocks; and
a control circuit configured to, when executing garbage collection or wear leveling, determine candidate memory blocks among the plurality of memory blocks, and determine, when a deviation in a reference factor among the candidate memory blocks is equal to or less than a set threshold deviation, one or more victim memory blocks for garbage collection or wear leveling according to characteristics of map updates for data stored in the candidate memory blocks,
wherein the control circuit sets flags for the candidate memory blocks within the N number of candidate memory blocks when the deviation is equal to or less than a set threshold deviation, and determines the victim memory blocks for the target operation on the basis of flags set for the candidate memory blocks,
wherein the flags are different from the reference factor, and
wherein each of the flags indicate a characteristic of data stored in a candidate memory block corresponding to the flag.

* * * * *